(12) United States Patent  
Propheter-Hinckley

(10) Patent No.: US 7,922,444 B2
(45) Date of Patent: Apr. 12, 2011

(54) CHAMFER RAIL POCKETS FOR TURBINE VANE SHROUDS

(75) Inventor: Tracy A. Propheter-Hinckley, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 1119 days.

(21) Appl. No.: 11/655,546

(22) Filed: Jan. 19, 2007

(65) Prior Publication Data

US 2010/0272559 A1    Oct. 28, 2010

(51) Int. Cl.
*F01D 9/04* (2006.01)

(52) U.S. Cl. ..... 415/139; 415/110; 415/191; 415/170.1; 29/888.3

(58) Field of Classification Search .................. 415/110, 415/137, 139, 191, 211.2, 170.1; 29/888.3
See application file for complete search history.

(56) References Cited

U.S. PATENT DOCUMENTS

| | | | |
|---|---|---|---|
| 3,728,041 A * | 4/1973 | Bertelson | 415/189 |
| 4,688,988 A | 8/1987 | Olsen | |
| 4,767,260 A | 8/1988 | Clevenger et al. | |
| 5,158,430 A | 10/1992 | Dixon et al. | |
| 5,167,485 A * | 12/1992 | Starkweather | 415/115 |
| 5,374,161 A * | 12/1994 | Kelch et al. | 415/139 |
| 5,709,530 A | 1/1998 | Cahill et al. | |
| 5,823,741 A * | 10/1998 | Predmore et al. | 415/134 |
| 5,868,398 A | 2/1999 | Maier et al. | |
| 5,988,975 A | 11/1999 | Pizzi | |
| 6,241,467 B1 | 6/2001 | Zelesky et al. | |
| 6,340,285 B1 * | 1/2002 | Gonyou et al. | 415/116 |
| 6,450,766 B1 | 9/2002 | Honda | |
| 2006/0082074 A1 | 4/2006 | Synnott et al. | |

* cited by examiner

*Primary Examiner* — Igor Kershteyn
(74) *Attorney, Agent, or Firm* — Kinney & Lange, P.A.

(57) ABSTRACT

A shroud rail for retaining a feather seal in a vane shroud of a gas turbine engine comprises a slot for, receiving the feather seal, and a chamfer rail pocket for lightening the shroud rail. The slot traverses the vane shroud and includes a slot base extending from a leading edge to a trailing edge of the shroud rail, and a slot wall extending generally perpendicularly from the slot base. The chamfer rail pocket comprises a pocket wall extending along the slot wall, and a chamfer wall extending from the pocket wall at an angle oblique to the slot base.

25 Claims, 8 Drawing Sheets

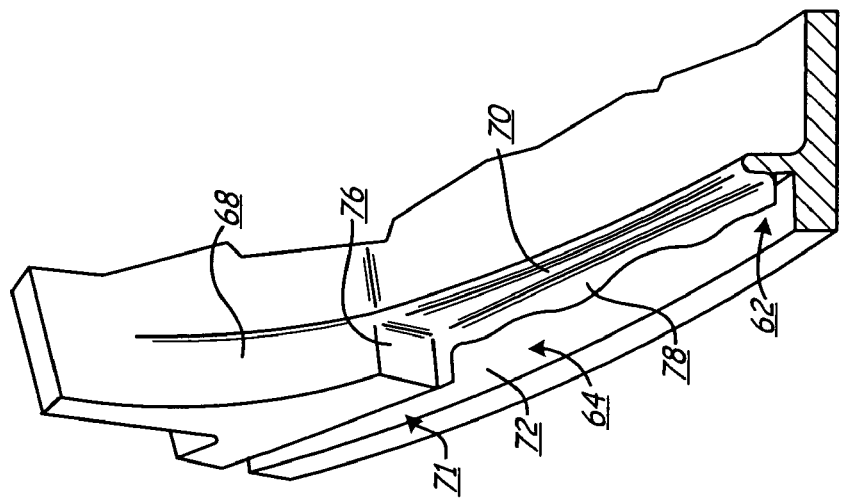
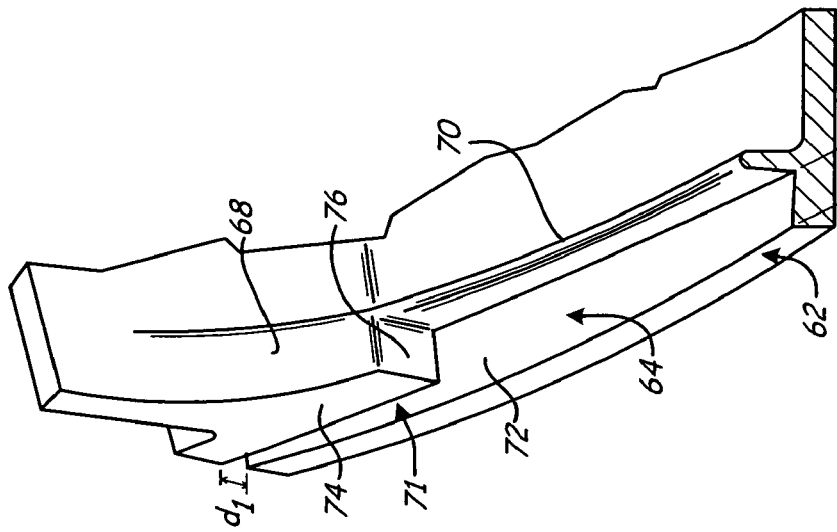
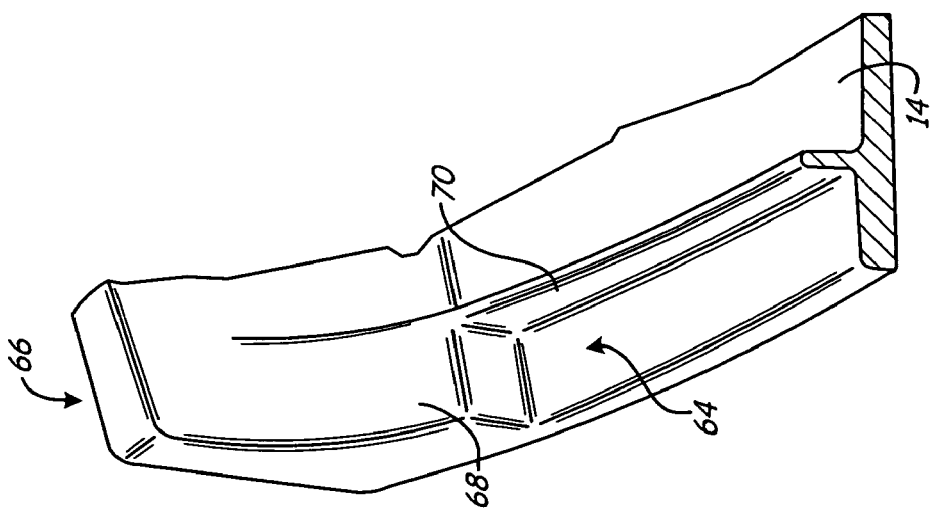

CHAMFER RAIL POCKETS FOR TURBINE VANE SHROUDS

This invention was made with U.S. Government support under contract number N00019-02-C-3003 awarded by the United States Air Force, and the U.S. Government may have certain rights in the invention.

BACKGROUND OF THE INVENTION

The present invention is related to gas turbine engines, and in particular to vane shroud rail pockets for feather seals. Gas turbine engines operate by combusting fuel in compressed air to create heated gases with increased pressure and density. The heated gases are ultimately forced through an exhaust nozzle, which is used to step up the velocity of the exiting gases and in-turn produce thrust for driving an aircraft. In turbofan engines the heated gases are used to drive a turbine for rotating a fan to produce thrust, and to drive a turbine for driving a compressor that provides the compressed air used during combustion. Compressors and turbines are comprised of alternating stages of stator vanes and rotor blades that are arranged radially around a center axis to form an axial air and gas flow path. In the compressor, for example, rotating blades push air past the stationary vanes at each stage to increase the pressure and density of the air. The stator vanes convert the kinetic energy of the air into pressure, and they redirect the trajectory of the air coming off the rotors for flow into the next compressor stage. Gas turbine efficiency is closely linked to the ability of a gas turbine engine to direct airflow through each rotor/stator stage efficiently and without leakage. As such, various air seals are used throughout the engine to, among other things, maintain airflow and pressure balances.

It is particularly advantageous to seal the outer and inner diameter ends or the rotor blade and stator vane stages. The blades are fixed at their inner end to rotating rotors connected to a turbine shaft, and the vanes are suspended from engine casings between the rotating blades. In order to facilitate engine disassembly and repairs, each vane stage is typically comprised of a plurality of vanes or vane segments, thus necessitating a seal between adjacent vanes at each stage as this interface provides a point for potential leakage of airflow from the flow path. Accordingly, each vane typically includes inner and outer diameter vane shrouds (or platforms) that abut vane shrouds of an adjacent vane. A feather seal is typically provided between adjacent vane shrouds to assist in sealing the flow path. In order to accommodate changing engine conditions, the feather seal is not directly secured to the vane shroud, but is maintained relatively stationary between feather seal rails of adjacent vane shrouds. In order to secure the feather seal, the rails must be of a significant thickness and must be machined to precise dimensions. Thus, typical feather seal rails add significant weight and complexity to each vane shroud. There is, therefore, a need for improved vane shrouds that are lighter and more easily manufactured.

BRIEF SUMMARY OF THE INVENTION

The present invention is directed to a shroud rail for retaining a feather seal in a vane shroud of a gas turbine engine. The shroud rail comprises a slot for receiving the feather seal, and a chamfer rail pocket for lightening the shroud rail. The slot traverses the vane shroud and includes a slot base extending from a leading edge to a trailing edge of the shroud rail, and a slot wall extending generally perpendicularly from the slot base. The chamfer rail pocket comprises a pocket wall extending along the slot wall, and a chamfer wall extending from the pocket wall at an angle oblique to the slot base.

BRIEF DESCRIPTION OF THE DRAWINGS

FIG. 5A shows a casting used to manufacture an outer diameter vane shroud of FIG. 3 having a vertical plunge rail pocket.

FIG. 5B shows the casting of FIG. 5A machined to have an outer diameter vane shroud having a vertical plunge rail pocket machined to acceptable dimensions.

FIG. 5C shows the casting of FIG. 5A machined to have an outer diameter vane shroud having a vertical plunge rail pocket machined to unacceptable dimensions.

DETAILED DESCRIPTION

Figure 1:
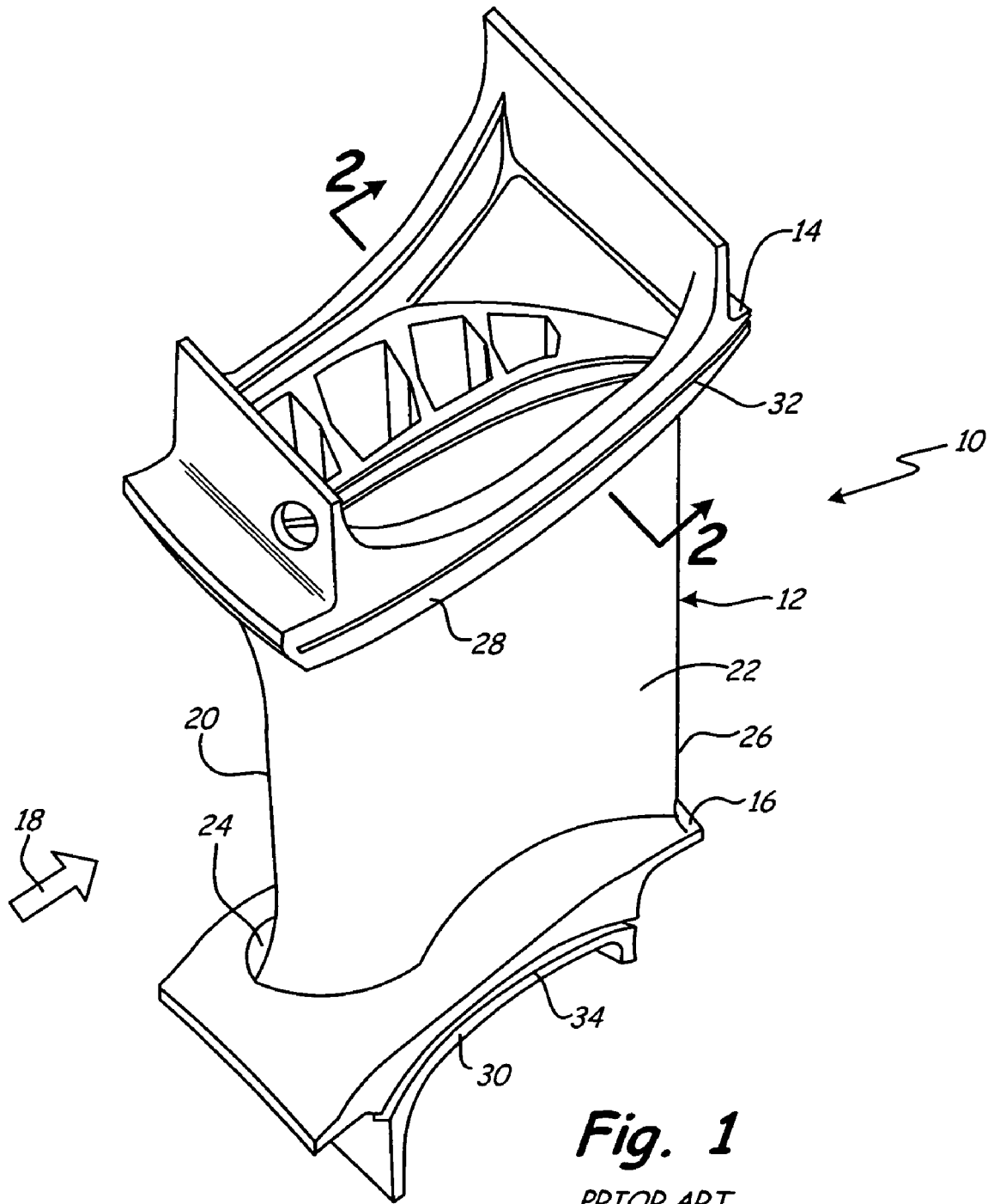
FIG. 1 shows an exemplary stator vane having prior art feather seal shroud rails.

FIG. 1 shows stator 10 comprising vane 12, outer diameter shroud 14 and inner diameter shroud 16. Stator 10 comprises a typical stator vane that can be used in a compressor section or turbine section of a gas turbine engine. Stator 10 generally functions to redirect the trajectory of passing air coming from a blade of one turbine stage to a blade of a subsequent turbine stage to increase engine efficiency. For example, inlet air 18 approaches leading edge 20 of stator 10 after passing through an upstream rotor blade stage. Vane 12, having pressure side 22 and suction side 24, redirects the flow of air 18 such that, after passing by trailing edge 26, the incidence of air 18 on the subsequent rotor blade stage is optimized.

In order to improve engine efficiency, vane shroud 14 and vane shroud 16 are provided at the outer diameter and inner diameter ends of vane 12, respectively. Vane shrouds, or platforms, 14 and 16 form outer and inner boundaries of the airflow path through the gas turbine engine and prevent leakage of air into and out of the airflow path. Shrouds 14 and 16 comprise generally conical main shroud bodies that abut shrouds from adjacent stators such that annular enclosures are provided at the inner and outer ends of vane 12 to form an airflow duct. Outer diameter shroud 14 includes outer diameter mate face 28 and inner diameter shroud includes inner diameter mate face 30. However, vane shrouds 14 and 16 do not completely seal between adjacent members as the annular enclosures are not always contiguous during the operation of the engine. In order to improve the seal, and increase engine efficiency, vane shrouds 14 and 16 are provided with prior art shroud rails 32 and 34, respectively, that receive and hold feather seal members between adjacent shrouds. The feather seal member spans the gap present between adjacent shroud members, thus sealing the annular duct formed by the shrouds.

Figure 2:
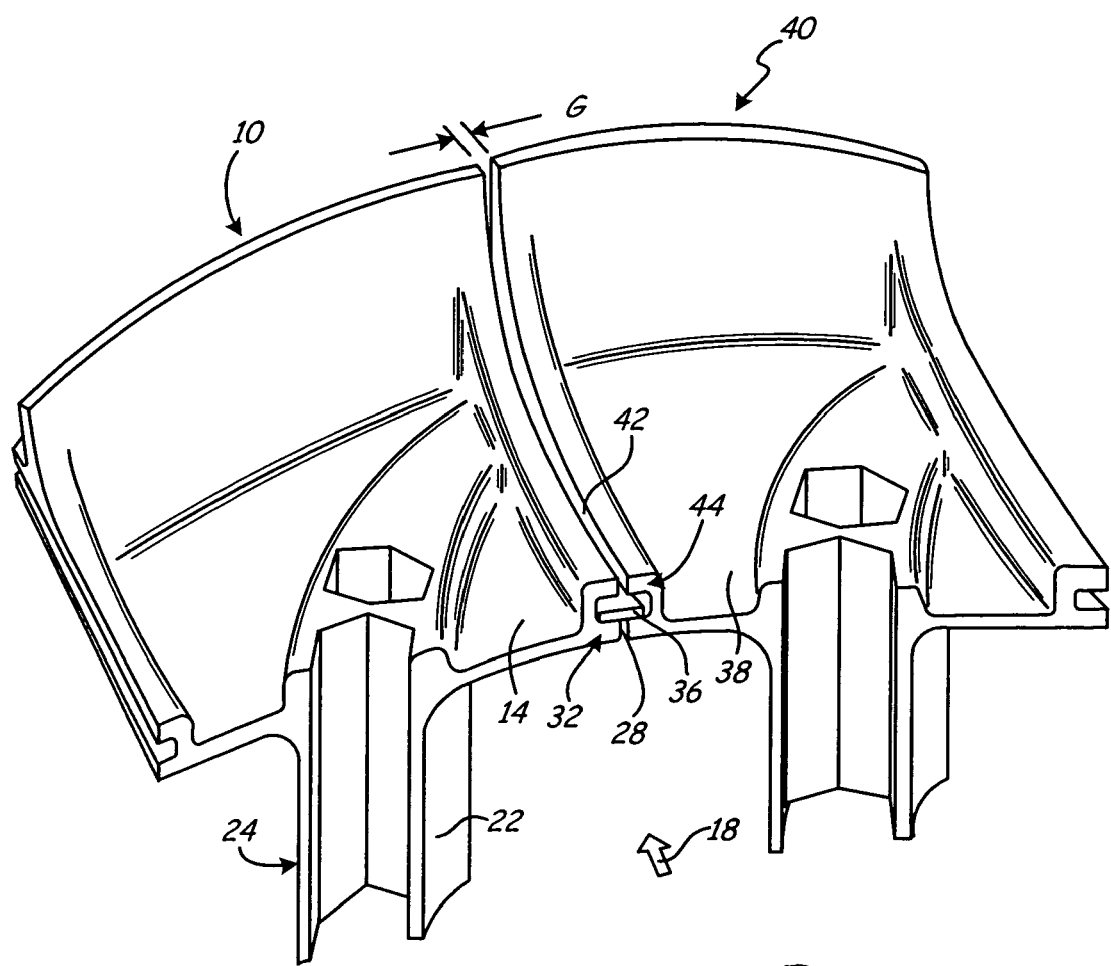
FIG. 2 shows a cross sectional view of an assembled pair of stator vanes of FIG. 1 showing the assembly of an outer diameter shroud feather seal system.

FIG. 2 shows cross sectional view 2-2 of stator 10 of FIG. 1 fitted with feather seal 36. Feather seal 36 is slidably positioned between outer diameter shroud 14 of stator 10 and outer diameter shroud 38 of adjacent stator 40. Shroud 14 includes shroud rail 32 on pressure side 22, and shroud 38 includes mating shroud rail 44 on its suction side. Outer diameter mate face 28 of shroud 14 is positioned next to outer diameter mate face 42 of shroud 38. Feather seal 36 is positioned between mate face 28 and mate face 42 inside shroud rail 32 and shroud rail 44. Likewise, a feather seal is positioned between suction side 24 of shroud 14 and the pressure side of another adjacent shroud. Additionally, pressure side and suction side feather seals are provided at the inner diameter ends of stators 10 and 40. Gap G is typically maintained between adjacent shrouds and is maintained as small as possible to prevent air leakage. Adjacent mate faces, however, do not touch, as some room must be allowed for shifting of stator 10 during operation of the gas turbine engine. For example, stator 10 shifts and changes from thermal growth or mechanical strains that arise due to changing engine operating conditions. Thus, feather seal 36 is provided to bridge gap G between mate face 28 and mate face 42 such that airflow 18 is prevented from or reduced in its ability to escape between shroud 14 and shroud 38. Feather seal 36 typically comprises a rectangular elongate sheet metal body having a thickness on the order of about 0.0625 inch (~0.15875 cm) and a length that spans most of the length of the shroud.

In order to accommodate feather seal 36, it is necessary to increase the size and complexity of shrouds 14 and 38 in order to provide rails 32 and 44. Rail 32 results in shroud 14 being much thicker than if rail 32 were not provided. For example, shroud rail 32 must be large enough and sturdy enough to hold feather seal 36 while also allowing feather seal 36 room to shift as the engine operating conditions change. Additionally, due to the extremely thin nature of feather seal 36, rail 32 must be machined into stator 10 after casting, often requiring multiple finishing steps. Each additional manufacturing process required to produce stator 10 gives rise to an additional potential source for manufacturing defects and manufacturing safety hazards. Previous manufacturing methods and vane shroud systems have attempted to produce cheaper, safer and lighter stators having feather seals. These methods and systems, however, result in stator vanes necessitating further improvements.

Figure 3:
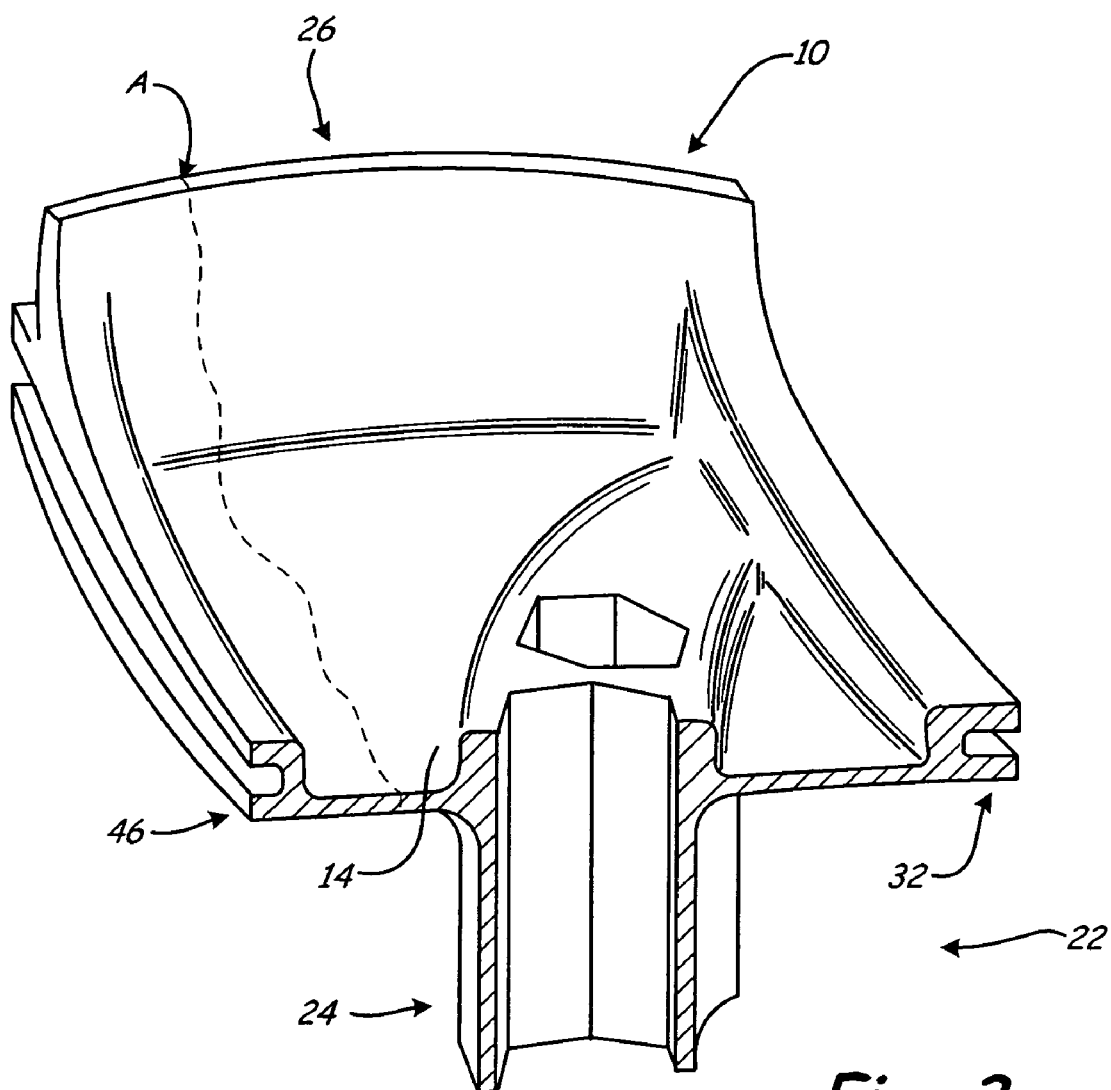
FIG. 3 shows a cross sectional view of an outer diameter vane shroud of FIG. 1 having a standard feather seal shroud rail.
Figures 4A, 4B:
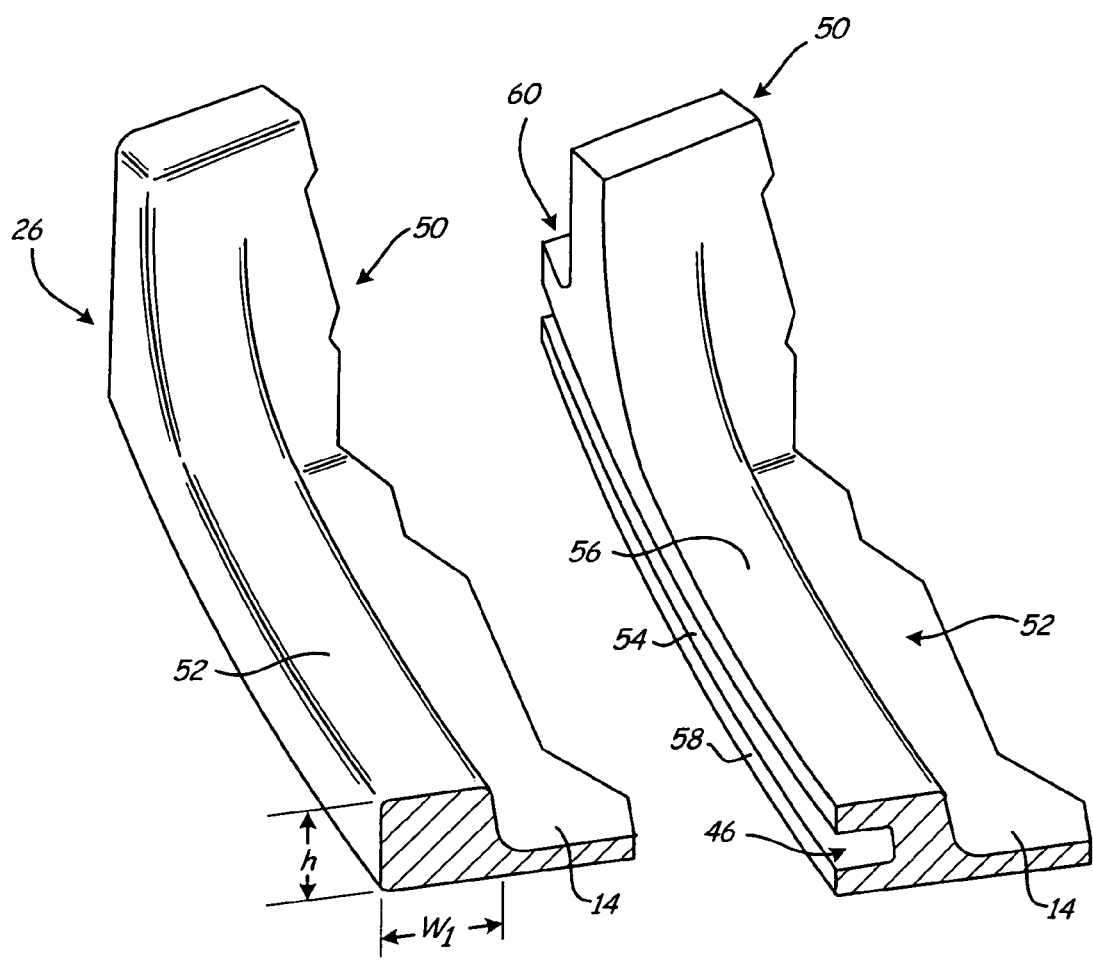
FIG. 4A shows a casting used to manufacture the outer diameter vane shroud of FIG. 3 having a standard shroud rail.
FIG. 4B shows the casting of FIG. 4A machined to have the standard shroud rail of FIG. 3.
Figure 6A:
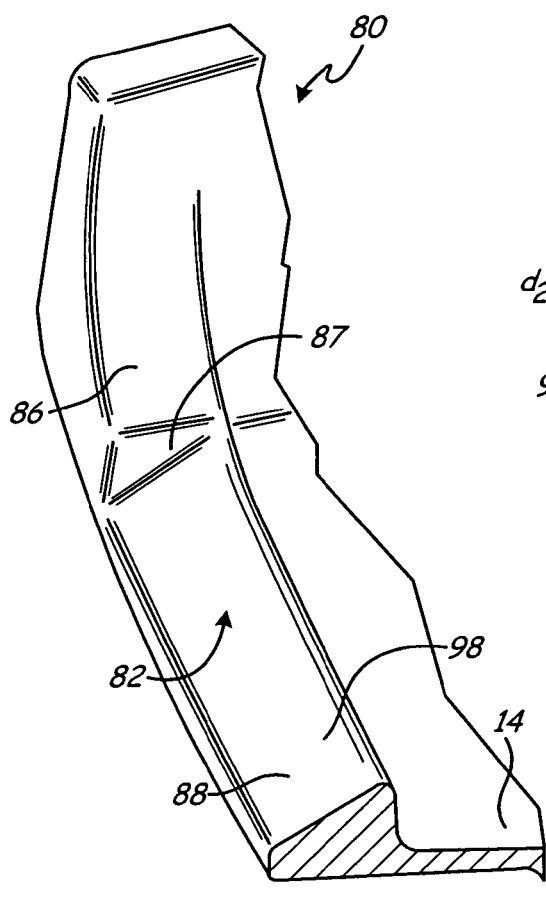
FIG. 6A shows a casting used to manufacture an outer diameter vane shroud of FIG. 3 having a chamfer rail pocket of the present invention.
Figure 6B:
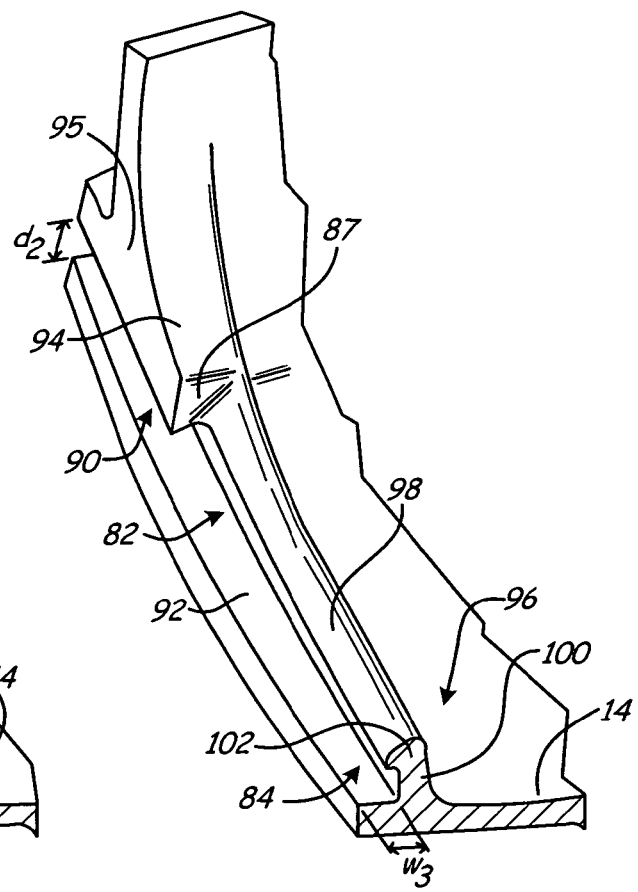
FIG. 6B shows the casting of FIG. 6A machined to have an outer diameter vane shroud having a chamfer rail pocket of the present invention.

FIG. 3 shows cross section 2-2 of FIG. 1, showing trailing edge portion 26 of stator 10, including vane 12, shroud 14, pressure side 22 and suction side 24. Shroud 14 exemplifies a typical shroud into which can be integrated various shroud rail feather seal systems. For example, shroud 14 is shown in FIG. 3 as having pressure side outer diameter shroud rail 32 and suction side outer diameter shroud rail 46. Suction side outer diameter shroud rail 46 shows a standard, prior art shroud rail design that can be used in conjunction with shroud 14. However, the design of shroud 14 can be modified to integrate other shroud rail systems. For illustrative purposes, the suction side of shroud 14 is broken off of stator 10 at break line A in FIGS. 4A through 6B to show steps necessary for manufacturing shroud 14 with various shroud rail designs, both new and old. Steps necessary for manufacturing shroud 14 with standard rail 46 are shown in FIGS. 4A and 4B. Steps required for manufacturing shroud 14 with a prior art vertical plunge rail pocket are shown in FIGS. 5A through 5C. Steps necessary for manufacturing shroud 14 with a chamfer rail pocket of the present invention are shown in FIGS. 6A and 6B.

FIG. 4A shows a portion of casting 50 along trailing edge 26 that is used to produce vane shroud 14 with a standard feather seal shroud rail. FIG. 4B, discussed concurrently with FIG. 4A, shows casting 50 of FIG. 4A into which is machined standard feather seal rail 46, as is seen in FIG. 3. Shroud 14 is integrally cast with stator 10 as part of casting 50, which includes rail block 52 for fabricating rail 46. In general, casting processes produce pieces having dimensional tolerances much larger than are required of shroud 14. As such, casting 50 and rail block 52 are cast larger than are required of the final dimensions of shroud 14 and without features necessary for operation of shroud 14. Thus, casting 50 and rail block 52 are precisely machined to final dimensions and to include features such as base portion 54 and overhang portion 56 of feather seal rail 46. Other features are machined into block 52 to finish the shape of shroud 14. For example, rail block 52 is machined down to form mate face 58 so that shroud 14 will mate flush with an adjacent shroud.

Rail block 52 runs the entire suction side length of shroud 14, from trailing edge 26 to the leading edge 20 (not shown if FIGS. 4A and 4B, see FIG. 1), such that rail 46 can be machined into rail block 52. Standard rail 46 runs the entire length of shroud 14 so that base portion 54 and overhang portion 56 will envelop half of a feather seal, like that of feather seal 36, along the entire length of the feather seal. Accordingly, rail block 52 has height h and width w1 so that it can completely accommodate the feather seal along the suction side of shroud 14. As can be seen in FIG. 4A, rail block 52 adds significant material and weight to casting 50, much of which is left after final machining as shown in FIG. 4B. During final machining of shroud 14, rail 46 is machined into the length of rail block 52. Rail 46 is taken roughly down the center of block 52 to form base portion 54 and overhang portion 56 of rail 46. Base portion 54 and overhang portion 56 have varying thicknesses, which are dictated by the shape of shroud 14 that is required to form the airflow path. The varying thicknesses of portions 54 and 56 assist in strengthening shroud 14 and rigidifying and retaining the feather seal. Base portion 54 and overhang portion 56 must be sufficiently thick to, not only retain the feather seal, but to survive the stress imparted in shroud 14 during operation of a gas turbine engine. Thus, in order to accommodate standard rail 46, shroud 14 requires that substantial material be added to stator 10. It is, however, desirable to reduce the weight of shroud 14 as much as possible. Accordingly, attempts are made to reduce the weight of shroud 14 by removing unnecessary or discretionary material from casting 50. For example, shroud notch 60 is removed from shroud 14 along trailing edge 26. Further attempts have been made to reduce the weight of shroud 14 by reducing the size and weight of standard rail 46. For example, pockets can be machined into rail 46 to remove weight after rail block 52 is cast and rail 46 is machined. This, however, typically involves precision machining methods such as done with electrode discharge machining. Other attempts to lightening shrouds having feather seal rails involve casting the shroud with a rail pocket and then machining the shroud to final dimensions.

FIGS. 5A and 5B show manufacturing steps for producing shroud 14 having shroud rail 62 with vertical plunge rail pocket 64 from casting 66. FIG. 5A shows shroud 14 in a pre-machined state as casting 66. FIG. 5B shows casting 66 of FIG. 5A machined to acceptable tolerances to form rail 62 including plunge rail pocket 64. Plunge rail pocket 64 represents an improvement over standard rail 46 of FIG. 4B, as material is removed from shroud 14 along a middle span of rail 62 to reduce weight.

Casting 66 includes trailing edge block 68 and wall 70, which are used to form rail 62 to retain a feather seal such as feather seal 36. Slot 71 is machined into block 68 of casting 66 to form base 72 and retainment tab 74. Trailing edge block 68 forms retainment tab 74, which retains the trailing edge portion of the feather seal. Similarly, the leading edge of shroud 14 is cast with a leading edge block into which is machined a leading edge retainment tab. Thus, the feather seal is retained within rail 62 at both the trailing edge and leading edge of shroud 14. Additionally, during operation of a gas turbine engine, pressure differentials within the engine also typically push the feather seal down toward shroud 14. Thus, the feather seal is adequately retained within rail 62 at the leading and trailing ends by the respective retainment tabs, and along the center of rail 62 by the engine pressure. Accordingly, it is unnecessary to restrain the feather seal along the entire length of slot 71. Thus, plunge rail pocket 64 is positioned between trailing edge retainment tab 72 and the leading edge retainment tab to remove weight from rail 62. However, to prevent airflow 18 (FIG. 1) from escaping through rail 62 along the middle portion, wall 70 is provided along the length of slot 71.

FIG. 5B shows plunge rail pocket 64 after a machining process that yields slot 71 formed to acceptable dimensions. Slot 71 extends the length of rail 62 and begins and terminates underneath trailing edge block 68 and the leading edge block, respectively. Slot 71 starts just below tab 74 and is machined to have depth d1, which extends downward into block 68 just below face 76. After mate face 74 is machined into casting 66, slot 71 has width w2 that extends into shroud 14 to accommodate the feather seal. Slot 71 extends from underneath block 68 toward the leading edge of shroud 14 such that it is approximately flush with wall 70 and such that it removes the bottom material forming vertical pocket 64. As such, slot 71 extends into block 68 such that face 76 is only marginally, if at all, truncated, and wall 70 is relatively smooth. Thus, when properly formed, pocket 64 forms a clean cavity between face 76, base portion 72 and wall 70, free of any sharp or jagged edges. Thus, only simple edge finishing processes are subsequently necessary if desired. However, since rail 62 has very small dimensions with very tight tolerances, it is easy for shroud rail pocket 64 to have defects as slot 71 is machined into casting 66. As such, depth d1 and width w2 are easily slightly misaligned with respect to casting 66 such that potentially hazardous defects are formed requiring additional expensive machining operations.

FIG. 5C shows casting 66 of FIG. 5A machined to form outer diameter vane shroud 14 having vertical plunge rail pocket 64 machined to unacceptable dimensions. Since casting 66 is not cast to tight tolerances, in combination with the tight tolerances of slot 71, thin, jagged membrane 78 is sometimes formed along pocket 64. Membrane 78 typically arises because of the tolerance overlap between the bottom of pocket 64 and the top of slot 71. Membrane 78 may arise from contours in casting 66 extending above the plane formed by the bottom of face 76 such that they are not removed in the formation of slot 71. Alternatively, membrane 78 may form because slot 71 is machined at the lower tolerance limit of dimension d1 such that slot 71 does not fully break into pocket 64 and the contours and bottom of pocket 64 are not reached.

Membrane 78 is an undesirable feature that poses manufacturing and safety problems. First, membrane 78 is typically thin such that it forms a razor-like edge that poses a hazard to handling of stator 10. Thus, in addition to performance reasons, it is desirable to remove membrane 78 from shroud 14. However, since stator 10 is typically cast from high strength super alloys it is difficult to remove membrane 14. Typically, membrane 78 is removed by hand operations that can injure the operator, damage stator 10 and result in non-uniform parts. Alternatively, membrane 78 must be removed by additional, expensive machining operations. Accordingly, it is desirable to include rail pockets within shroud 14 to remove weight from stator 10, while avoiding manufacturing defects for both safety and manufacturing reasons.

FIGS. 6A and 6B show casting 80 and steps for manufacturing shroud 14 having chamfer rail pocket 82 and shroud rail 84 from casting 80. FIG. 6A shows shroud 14 in a pre-machined state as casting 80. FIG. 6B shows casting 80 of FIG. 6A machined to include rail 84 including chamfer rail pocket 82. Chamfer rail pocket 82 represents an improvement over standard rail 46 of FIG. 4B and plunge rail pocket 64 of FIG. 5B. Chamfer rail pocket 82 removes excessive material from shroud 14 along a middle span of rail 84 to reduce weight, while also reducing manufacturing costs by removing hazardous and costly defects.

FIGS. 6A and 6B show the trailing edge of casting 80, which includes retainment block 86, face 87 and chamfer rail block 88, which are machined to form rail 84 to retain a feather seal, such as that of feather seal 36. Slot 90 is machined into casting 80 to form base 92 and trailing edge retainment tab 94. Mate face 95 is machined into casting 80 to provide shroud 14 with a flat surface so as to mate flush with an adjacent shroud. Trailing edge block 86 forms retainment tab 94, which retains the trailing edge portion of the feather seal. Similarly, the leading edge of shroud 14 is cast with a leading edge block into which is machined a leading edge retainment tab. Thus, the feather seal is retained within rail 84 at both the trailing edge and leading edge of shroud 14. The feather seal is adequately retained within rail 84 at the leading and trailing ends by the respective retainment tabs, and along the central portion of rail 84 by pressure differentials arising during operation of the gas turbine engine. Accordingly, it is unnecessary to restrain the feather seal along the entire middle portion of slot 90. Thus, chamfer rail pocket 82 is positioned between trailing edge retainment tab 94 and the leading edge retainment tab. However, to prevent airflow 18 (FIG. 1) from escaping through rail 84 along the middle portion, slot wall 96 is provided along the length of slot 90. Slot wall 96 comprises 100 and 102, and utilizes sloped surface 98 of block 88 to eliminate the production of sharp edges during machining of slot 90.

Slot 90 is formed and positioned in much the same way as slot 71 of FIGS. 5A through 5C, though, due to chamfer rail block the advantages of the present invention are achieved. Slot 90 extends the length of rail 84 and begins and terminates underneath trailing edge block 86 and the leading edge block, respectively. Slot 90 starts just below tab 94 and is machined to have depth d2, which extends downward into block 86 from face 87. After mate face 95 is machined into casting 80, slot 90 has width w3 that extends into shroud 14 to accommodate the feather seal. Slot 90 extends from underneath block 86 toward the leading edge of shroud 14 such that material is removed from blocks 86 and 88. Depth d2 is typically short enough and width w3 narrow enough that slot 90 extends into block 88 such that pocket wall 100 and overhang or lip portion 102 are carved out of block 88. Surface 98 of block 88 forms an angled fillet, or chamfer wall, between pocket wall 100 and overhang portion 102 such that manufacturing defects associated with manufacturing rail 84 are reduced. Specifically, surface 98 is obliquely angled with respect to base 92 such that a definite bottom of pocket 82, or top of slot 90, is eliminated. The specific angle of surface 98 depends on design considerations taking into account dimensional tolerances of vane 10, surface variations in casting 80 and the amount of weight desired to be removed from rail 84. Thus, as slot 90 extends into block 88 overhang portion 102 will always have some thickness, which is typically greater than any variation in surface 98 that results in the production of membrane 78 of pocket 64. Production of razor-like edges is avoided because overhang portion 102 has a thickness that is greater than membrane 78. Also, this allows overhang portion 102 and other edges along surface 98 to be more readily machined such as with a chamfering process to form a break edge. Inefficient and hazardous manual finishing processes are therefor not required to bring rail 84 to final dimensions. As such, block 88 results in the production of wall 96 that has a dull, safe-to-handle edge. FIGS. 6A and 6B depict chamfer rail pocket 82 having obliquely angled surface 98 with a flat configuration.

Figure 7A:
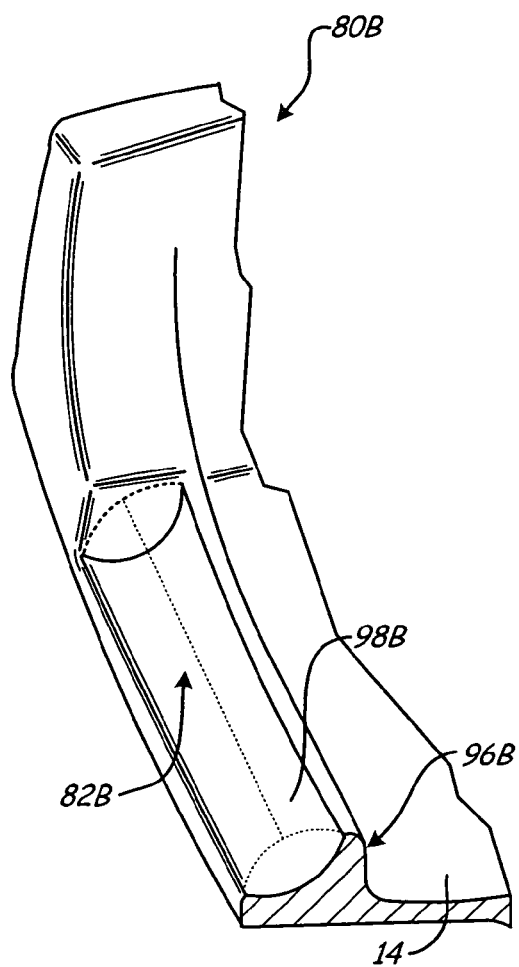
FIG. 7A shows a casting used to manufacture a second embodiment of the chamfer rail pocket of the present invention.
Figure 7B:
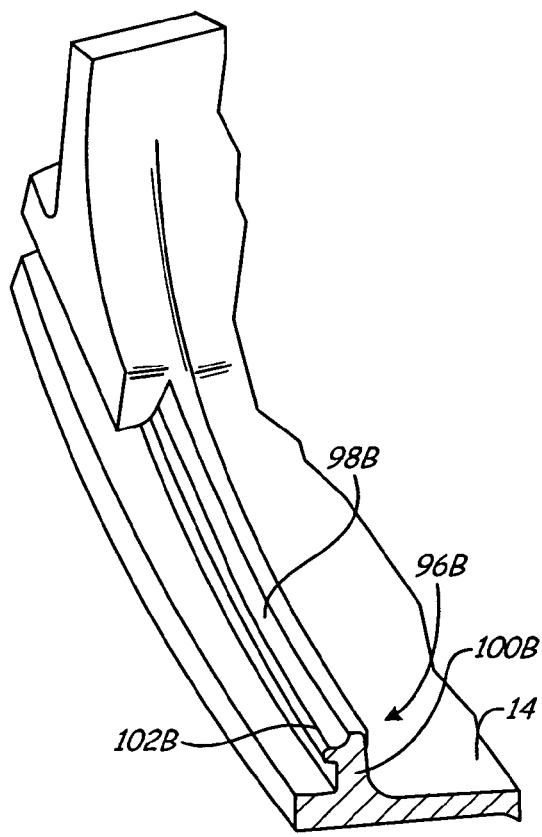
FIG. 7B shows the casting of FIG. 7A machined to form a chamfer rail pocket having an arcuate top surface.

FIGS. 7A and 7B show shroud 14 comprising an alternative embodiment of the present invention, chamfer rail pocket 82B. FIG. 7A shows casting 80B having arcuate surface 98B. Surface 98B comprises an arcuate surface extending out from pocket wall 96B. FIG. 7B shows casting 80B and arcuate surface 98B machined to form pocket wall 100B and overhang portion 102B, like that of wall 100 and overhang portion 102 of FIG. 6B. However, surface 98B is curved such that rail pocket 82B functions to reduce the weight of shroud 14, while still eliminating undesirable manufacturing features such as membrane 78. Surface 98B may be either concave (shown in solid lines) or convex (shown in dashed lines). Thus, the chamfer rail pocket of the present invention can have top surfaces with a variety of declined configurations, including flat (surface 98) and arcuate (surface 98B).

Figure 8:
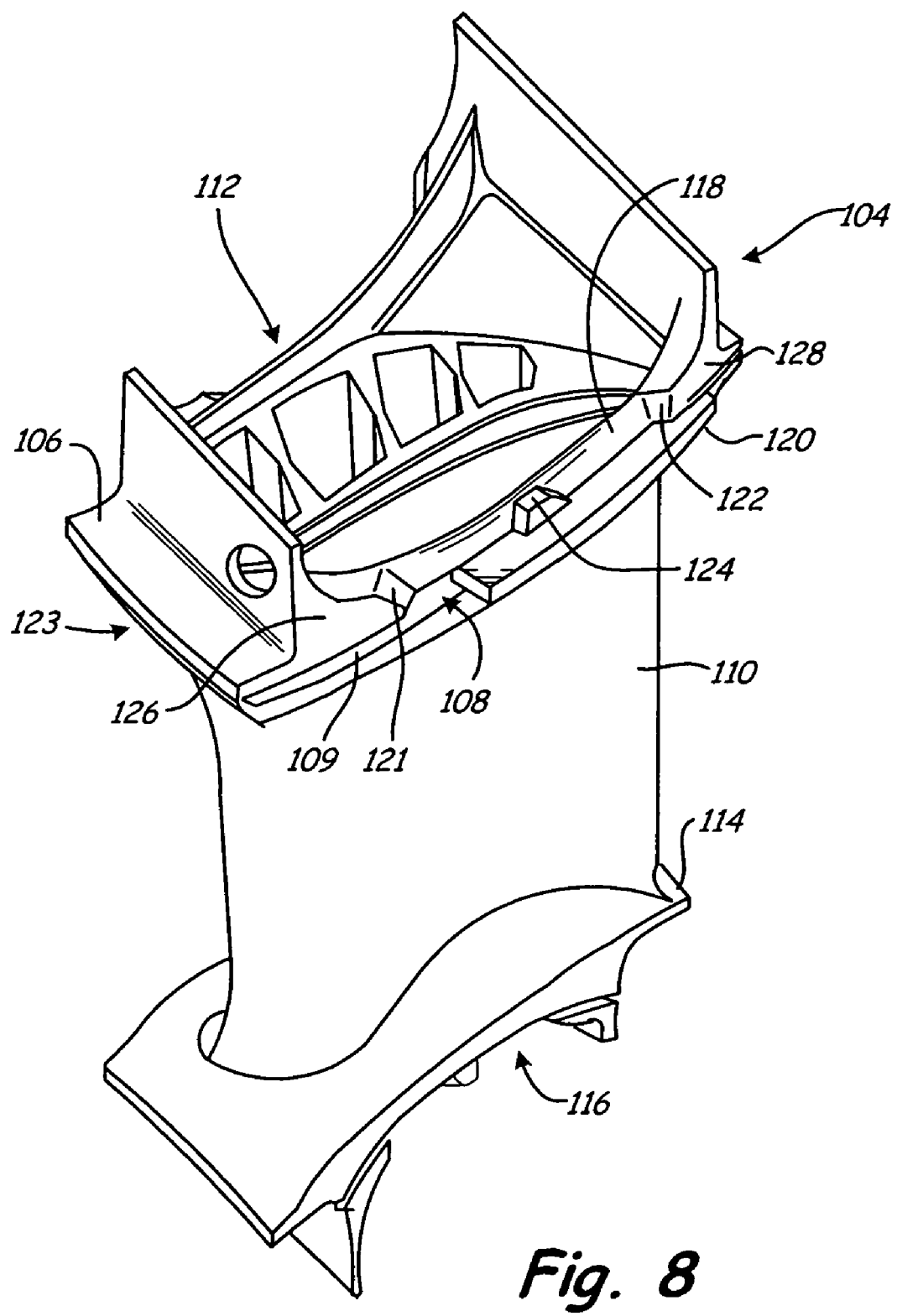
FIG. 8 shows a stator vane having an outer diameter vane shroud with a chamfer rail pocket like that of FIG. 6B.

FIG. 8 shows stator 104 having outer diameter vane shroud 106 with chamfer rail pocket 108 and feather seal rail 109. Chamfer rail pocket 108 is positioned on the pressure side of vane 110. Likewise outer diameter vane shroud 106 includes suction side chamfer rail pocket 112. Stator 104 also includes inner diameter vane shroud 114, which includes pressure side chamfer rail pocket 116 and a corresponding chamfer rail pocket on the suction side of inner diameter shroud 114.

The chamfer rail pockets of stator 104, including pockets 108, 112, and 116, are shaped and formed similarly to that of chamfer rail pocket 82 of FIGS. 6A and 6B. For example, chamfer rail pocket 108 includes angled surface 118, which eliminates sharp, jagged edges along pocket 108. Surface 118 also assists in retaining feather seal 120, a portion of which is shown in FIG. 8. Other features are also included in shroud 106 to assist in retaining feather seal 120.

Chamfer rail pocket 108 includes slanted side walls 121 and 122, midspan retainment tab 124, leading edge retainment tab 126 and trailing edge retainment tab 128. Slanted side walls 121 and 122 provide angled transitions between retainment tabs 126 and 128 and surface 118, which also reduce the production of sharp or jagged edges during manufacturing of pocket 108 and rail 109. Slanted side walls 121 and 122, like surface 118, eliminate a definite bottom of pocket 108 or rail 109 such that thin, jagged membranes are not left at the base of surfaces 121 and 122 as rail 109 is machined into shroud 106. Leading edge 123 of shroud 106 is closed off to seal rail 109 at leading edge 123 to prevent forward movement of feather seal 120.

Additionally, mid-span retainment tab or tang 124 is positioned centrally along pocket 108 above rail 109 between leading edge retainment tab 126 and trailing edge retainment tab 128. Mid-span tab 124 can be placed at the center of pocket 108, or closer to leading edge retainment tab 126 or trailing edge retainment tab 128, depending on design requirements. Mid-span retainment tab 124 assists in restraining the center portion feather seal 120. Mid-span tab 126 comprises a block that divides pocket 108 into two smaller pockets. Mid-span tab 126 can be fabricated out of a casting block similar to that of block 86 of FIG. 6A used to produce retainment tab 86. Mid-span tab 124 comprises an extension of surface 118 that extends out over rail 109 that is not removed by machining of rail 109.

Although the present invention has been described with reference to preferred embodiments, workers skilled in the art will recognize that changes may be made in form and detail without departing from the spirit and scope of the invention.

The invention claimed is:

1. A shroud rail for retaining a feather seal in a vane shroud of a gas turbine engine, the shroud rail comprising:
   a slot traversing the vane shroud and configured for receiving a feather seal, the slot comprising:
      a slot base extending from a leading edge to a trailing edge of the shroud rail; and
      a slot wall extending generally perpendicularly from the slot base;
   a chamfer rail pocket for lightening the shroud rail, the chamfer rail pocket comprising:
      a pocket wall extending along the slot wall; and
      a chamfer wall extending from the pocket wall at an angle oblique to the slot base.

2. The shroud rail of claim 1 wherein the chamfer rail pocket includes an overhang portion that extends from the pocket wall over the slot base, and the chamfer wall forms a fillet between the pocket wall and the overhang portion.

3. The shroud rail of claim 2 wherein the chamfer rail pocket further comprises a chamfer at an edge of the overhang portion and the chamfer wall.

4. The shroud rail of claim 1 and further comprising:
   a leading edge retainment tab configured for securing the feather seal in the slot at the leading edge; and
   a trailing edge retainment tab configured for securing the feather seal in the slot at the trailing edge.

5. The shroud rail of claim 4 wherein the overhang portion extends over the base portion such that the pocket wall and the overhang portion are configured to retain a feather seal along a length of the base portion between the leading edge retainment tab and the trailing edge retainment tab.

6. The shroud rail of claim 4 wherein the leading edge retainment tab and the trailing edge retainment tab include a slanted face linking each respective retainment tab with the angled chamfer wall.

7. The shroud rail of claim 4 and further comprising a central retainment tab along the chamfer rail pocket between the leading edge retainment tab and the trailing edge retainment tab.

8. The shroud rail of claim 1 wherein the chamfer wall includes a chamfered edge to provide a break edge between the slot wall and the pocket wall.

9. The shroud rail of claim 1 wherein a leading edge of the slot is closed off such that the shroud rail is configured to prevent forward movement of a feather seal.

10. A method for producing a vane shroud having a rail pocket, the method comprising:
    casting a vane shroud having:
       a generally conical shroud body having a leading edge, a trailing edge and a side edge disposed between the leading edge and the trailing edge;

a leading edge retainment block disposed along the side edge at the leading edge;

a trailing edge retainment block disposed along the side edge at the trailing edge; and a chamfer rail block disposed between the leading edge and trailing edge retainment blocks, the chamfer rail block comprising:

a pocket wall extending generally perpendicularly from the shroud body; and a chamfer wall extending from the pocket wall at an angle oblique to the shroud body; and machining a feather seal slot into the side edge to form a leading edge retainment tab at the leading edge retainment block, a chamfer rail pocket at the chamfer rail block, and a trailing edge retainment tab at the trailing edge retainment block.

11. The method of claim 10 and further comprising machining a break edge along the chamfer wall above the feather seal slot.

12. The method of claim 10 wherein the step of machining the feather seal slot further comprises:

machining a slot base between the leading edge retainment tab and the trailing edge retainment tab;

machining an overhang portion that extends from the pocket wall over the slot base such that the chamfer wall forms a fillet between the pocket wall and the overhang portion.

13. The method of claim 10 wherein the leading edge retainment tab and the trailing edge retainment tab include a slanted face with respect to the shroud body for linking each respective retainment tab with the chamfer wall.

14. The method of claim 10 wherein the chamfer rail block includes a center block such that the machining of the feather seal slot forms a central tab above the feather seal slot and along the chamfer wall between the leading edge retainment tab and the trailing edge retainment tab.

15. The method of claim 10 wherein the step of machining the feather seal slot further comprises spacing the feather seal slot a distance from the leading edge of the conical shroud body to close off a leading edge of the feather seal slot.

16. The method of claim 10 and further comprising the step of machining a mate face along the side edge along the leading edge retainment block, the trailing edge retainment block and the chamfer rail block.

17. A vane shroud for a stator vane of a gas turbine engine, the vane shroud comprising:

a body portion for attachment to an inner or outer diameter end of a stator vane;

a leading edge portion;

a trailing edge portion displaced axially from the leading edge;

a first side edge disposed between the leading edge portion and the trailing edge portion, and a first rail slot extending along the first side edge for securing a first feather seal;

wherein the first rail slot includes a rail pocket comprising:

a pocket wall extending from alongside the rail slot;

an overhang portion that extends from the pocket wall over the rail slot; and a declined top surface that forms a fillet between the pocket wall and the overhang portion.

18. The vane shroud of claim 17 wherein the rail pocket further comprises a chamfered edge along the declined top surface above the first rail slot.

19. The vane shroud of claim 17 and further comprising:

a leading edge retainment tab configured for securing the first feather seal in the slot at the leading edge; and a trailing edge retainment tab configured for securing the first feather seal in the slot at the trailing edge.

20. The vane shroud of claim 19 and further comprising a mid-span retainment tab along the rail pocket between the leading edge retainment tab and the trailing edge retainment tab.

21. The vane shroud of claim 19 and further comprising:

a second side edge disposed between the leading edge portion and the trailing edge portion and displaced circumferentially from the first side edge, and a second rail slot extending along the second side edge for securing a second feather seal;

wherein the second rail slot includes a rail pocket having an declined top surface with respect to a bottom surface of the second rail slot.

22. The vane shroud of claim 17 wherein the declined top surface comprises an arcuate surface.

23. The vane shroud of claim 17 wherein the declined top surface comprises a flat surface angled oblique to a bottom surface of the first rail slot.

24. A vane shroud for a stator vane of a gas turbine engine, the vane shroud comprising:

a body portion for attachment to an inner or outer diameter end of a stator vane;

a leading edge portion;

a trailing edge portion displaced axially from the leading edge;

a first side edge disposed between the leading edge portion and the trailing edge portion, and a first rail slot extending along the first side edge for securing a first feather seal;

wherein the first rail slot includes a rail pocket having a declined top surface comprising an arcuate surface.

25. A vane shroud for a stator vane of a gas turbine engine, the vane shroud comprising:

a body portion for attachment to an inner or outer diameter end of a stator vane;

a leading edge portion;

a trailing edge portion displaced axially from the leading edge;

a first side edge disposed between the leading edge portion and the trailing edge portion, a first rail slot extending along the first side edge for securing a first feather seal, wherein the first rail slot includes a rail pocket having a declined top surface;

a leading edge retainment tab configured for securing the first feather seal in the slot at the leading edge;

a trailing edge retainment tab configured for securing the first feather seal in the slot at the trailing edge; and a mid-span retainment tab along the rail pocket between the leading edge retainment tab and the trailing edge retainment tab.

* * * * *